United States Patent [19]

Berry

[11] Patent Number: 4,726,757

[45] Date of Patent: Feb. 23, 1988

[54] MOULDING APPARATUS

[75] Inventor: Francis D. Berry, Essex, England

[73] Assignee: The World Health Organisation, Geneva, Switzerland

[21] Appl. No.: 859,089

[22] PCT Filed: Aug. 13, 1985

[86] PCT No.: PCT/GB85/00359

§ 371 Date: Apr. 11, 1986

§ 102(e) Date: Apr. 11, 1986

[87] PCT Pub. No.: WO86/01145

PCT Pub. Date: Feb. 27, 1986

[30] Foreign Application Priority Data

| Aug. 13, 1984 [GB] | United Kingdom | 8420505 |
| Aug. 13, 1984 [GB] | United Kingdom | 8420506 |
| Aug. 13, 1984 [GB] | United Kingdom | 8420507 |
| Aug. 13, 1984 [GB] | United Kingdom | 8420508 |

[51] Int. Cl.$^4$ .................. B29C 45/08; B29C 45/66
[52] U.S. Cl. .................. 425/574; 264/328.8; 264/328.11; 425/576; 425/589; 425/595
[58] Field of Search ............ 425/145, 451, 451.6, 425/542, 574, 576, 589, 595; 264/328.1, 328.8, 328.11

[56] References Cited

U.S. PATENT DOCUMENTS

| 2,419,089 | 4/1947 | Quarnstrom | 249/205 |
| 3,293,691 | 12/1966 | Osgood | 405/576 |
| 3,856,444 | 12/1974 | Saltel | 425/261 |
| 4,072,458 | 2/1978 | Schlieckmann | 425/451.6 |
| 4,186,161 | 1/1980 | Ulmschneider et al. | 264/328.8 |

FOREIGN PATENT DOCUMENTS

| 2293295 | 10/1975 | France . |
| 828994 | 2/1960 | United Kingdom . |
| 1096702 | 12/1967 | United Kingdom . |

Primary Examiner—Jay H. Woo
Assistant Examiner—Timothy W. Heitbrink
Attorney, Agent, or Firm—Watson, Cole, Grindle & Watson

[57] ABSTRACT

A rotary turret injection moulding machine has a turntable (12) carrying a plurality of mould sets (17) and arranged to be rotated continuously, a device for injecting moulding material into the moulds and a clamping mechanism for holding the moulds closed during the injection being reciprocated in synchronsym with the rotation of the turntable. Each mould set has one part (18) firmly mounted on the turntable and another part (19) which pivots for opening and closing the mould. A cam (40) follower coupled to the movable part cooperates with a stationary cam (41) extending around the turntable axis to close and open the mould as the turntable is rotated. The movable mould part includes a mould plate mounted for tilting movement on its support arm, and dowel pins (30) and sockets (31) on the mould plates are arranged to ensure correct alignment when they are closed together.

12 Claims, 6 Drawing Figures

MOULDING APPARATUS

BACKGROUND OF THE INVENTION

1. Field of the Invention

This invention relates to injection moulding apparatus, and in particular, although not exclusively, to an injection moulding apparatus of the so-called rotary turret kind in which a plurality of mould sets are carried on a turntable, rotation of the turntable enabling the mould sets to be moved successively to an injection station at which each mould set is clamped firmly closed and molding material is injected into the mould cavity.

2. The Prior Art

Rotary turret injection moulding machines in which the turntable is indexed around to bring the mould sets in turn to the injection station are known. However, the turntables are driven intermittently, and this can cause problems, especially when there is a large number of mould sets and a large mass is involved.

SUMMARY OF THE INVENTION

The present invention provides a solution to this problem. In accordance with a first aspect of the invention, an injection moulding apparatus comprises a turntable, drive means for continuously rotating the turntable, a plurality of mould sets carried on the turntable, and a clamping and injecting assembly including means for clamping each mould set closed and means for injecting moulding material into the clamped mould set, the clamping and injecting assembly being mounted for reciprocal movement along an arcuate path in synchronism with the rotation of the turntable.

With such an arrangement the difficulties encountered in repeatedly starting and stopping rotation of a turntable having large inertia are avoided, the clamping and injecting assembly which may have comparatively small inertia being driven instead.

In a preferred construction the turntable rotates about a central shaft and the clamping and injecting assembly includes a support member and an arm journalled on the shaft and connected to the support member for guiding the member concentrically with the turntable during reciprocation of the clamping and injecting assembly.

To facilitate synchronous movement of the clamping and injecting assembly with the turntable it is expedient for latching means to be provided for latching the clamping and injecting assembly to the turntable to be moved therewith during a forward stroke, means being provided for driving the clamping and injecting assembly in the opposite direction through a return stroke.

In known injection moulds the mould parts which form the mould cavity are generally guided for movement towards and away from each other by guide rods which extend between them. The guide rods are inconvenient because they impede access to the opened mould, whereby removal of the moulded articles is hindered.

In accordance with a second aspect of the invention a simple answer to this problem is achieved by an injection moulding apparatus comprising first and second mould parts movable relative to each other between open and closed positions, said mould parts defining a mould cavity in the closed position thereof, and the first mould part being mounted on a support characterised in that the second mould part is arranged to pivot about an axis fixed with respect to the first mould part during said movement between the open and closed positions of the mould parts.

A pivotal connection between the mould parts enables the movable part to be displaced easily to an open position in which it is substantially clear of the other part, whereby unimpeded removal of the moulded articles from the mould is facilitated. It is preferable that the movable part be capable of rotating through at least about 90° between the open and closed positions.

As mentioned above, in known injection moulds the parts which form the mould cavity are generally guided for movement towards and away from each other by guide rods. In order to ensure that the parts will close properly together they must be accurately aligned. Even a small misalignment can result in the moulded articles being unacceptable and having to be rejected.

In accordance with a third aspect the present invention proposes a solution to this problem by providing an injection moulding apparatus comprising a mould set including two members movable relative to each other between an open position and a closed position defining a mould cavity, characterised in that one of said mould members is capable of tilting movement relative to the other member as the members are brought together into the closed position, and guide means are provided on the mould members and engage as the mould members are moved into the closed position to ensure correct alignment between said members.

A mould set of this construction has the advantage that the mould members are guided automatically into correct alignment each time the mould is closed without requiring fixed guide rods extending between these members. This form of mould is of particular benefit when the mould members are not moved rectilinearly between the open and closed positions, such as when they are connected for relative pivotal movement in accordance with the preceding aspect of the invention.

In accordance with a fourth aspect the present invention provides an injection moulding apparatus comprising a turntable, drive means for rotating the turntable, a plurality of mould sets carried on the turntable, and means for opening and closing the mould sets, characterised in the mould opening and closing means includes stationary cam means extending around the turntable axis, and cam followers coupled to the respective mould sets and arranged to co-operate with the cam means to open and close each mould set in accordance with a predetermined sequence of operations as the turntable is rotated.

The use of a cam system to open and close the moulds allows the apparatus to be simplified since it obviates the need for fluid actuated devices having to be carried on the turntable with the mould sets, and also the need for fluid flow lines for conducting pressurised fluid to and from such device. Thus in a preferred construction the cam means is responsible for holding the mould sets closed during rotation of the turntable, except at the injecting station where an increased clamping force is applied by an actuator supported independently of the mould sets.

The stationary cam means proposed by the invention are especially suitable for an apparatus in which the mould sets have one part firmly mounted to the turntable and another part pivotable relative thereto in accordance with the second aspect of the invention mentioned above.

The different aspects of the invention as mentioned above may be conveniently combined in a rotary turret injection moulding machine of uncomplicated construction and which is efficient and reliable in operation.

A better understanding of the above and other novel features provided by the invention will be had from the following detailed description of a presently preferred embodiment, reference being made to the accompanying drawings.

DETAILED DESCRIPTION OF THE PREFERRED EMBODIMENT

The illustrated injection moulding machine has a stationary frame 1 supporting a rotor assembly for rotation about a vertical axis. The rotor assembly includes a hollow shaft 2 journaled in the frame by bearings 3. The shaft is rotated by a drive unit 4 mounted on the frame 1 and coupled kinematically to the shaft through a gear 5 and an endless chain 7 trained around the gear 5 and a sprocket 8 fast with the saft 2. A chain tensioner 9 is provided to maintain constant tension in the chain 7. Fast with the upper end of shaft 2 is a drive plate 10 with an inner hub portion connected to an outer ring by radial spokes. The outer ring of the drive plate is coupled to an annular turntable 12 by vertical tie rods 13 located at the ends of the spokes for the turntable to be driven around with the shaft 2. The turntable is supported in a horizontal plane by sets of rollers spaced apart around the frame 1. The roller sets include vertical rollers 14 arranged to contact the inner periphery of the annular turntable 12, and conical rollers 15 mounted with their axes inclined slightly to the horizontal for supporting the turntable from below. With this construction the rotor shaft is not required to support the full weight of the turntable 12 and those parts carried on it; as described below, and with the conical supporting rollers 15 the turntable has a natural self-centering tendency as it is rotated around on the frame 1.

Figure 2:
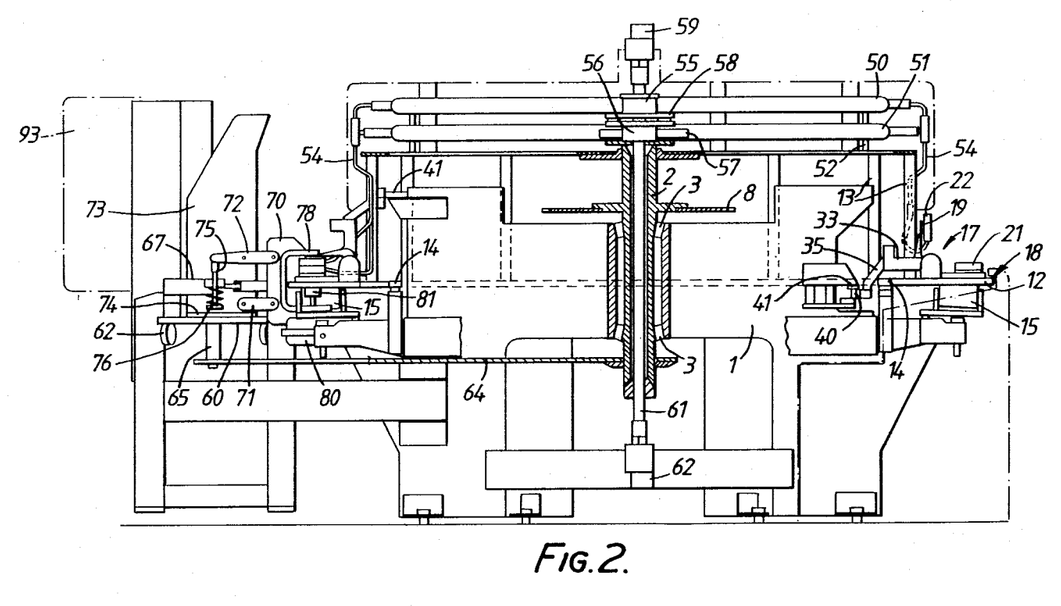
FIG. 2 is a vertical section through the machine.
Figure 3:
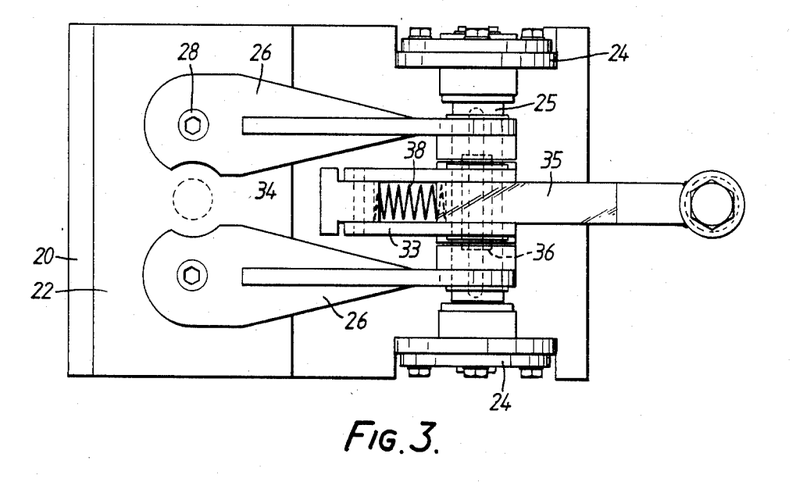
FIG. 3 is a detail plan view showing one of the mould assemblies.
Figure 4:
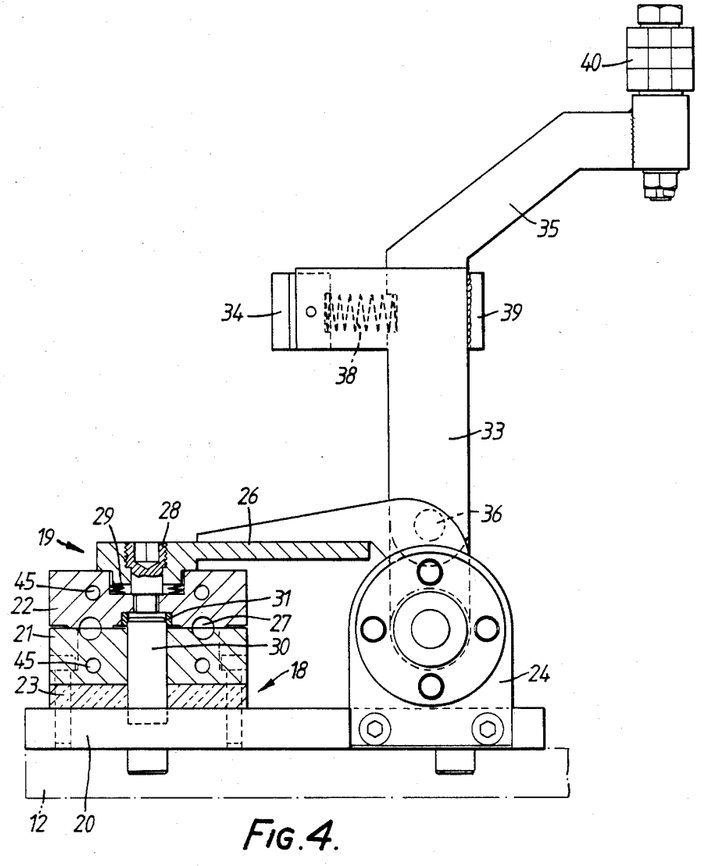
FIG. 4 is a side view of the mould assembly shown in FIG. 3.

Uniformly spaced apart around the outer periphery of the turntable 12 are notches 16, the purpose of which will be explained below, and mounted on the turntable adjacent each notch is a respective mould set 17. As may be best seen in FIGS. 3 and 4, each mould set includes a lower mould part 18 and an upper mould part 19. The part 18 includes a base plate 20 fixed on the turntable, and a bottom mould plate 21 secured on the base plate 20 with a member 23 of thermally insulating material located between them. Attached to the base plate are a pair of side plates 24 in which the opposite ends of a fulcrum pin 25 are journaled by bearings. The upper mould part 19 includes a pair of arms 26 carried on and keyed to the pin 25 and clamped to it by means of screws. At their free ends the arms 26 carry a top mould plate 22 which co-operates with the bottom plate 21 to define the mould cavity, or in the case of the illustrated embodiment a pair of annular cavities 27. The plate 22 is not secured rigidly to the arms 26, but is capable of some translational and tilting movement. The connection between the plate 22 and each arm 26 is effected by a screw 28 which is adjusted to permit some movement between the plate and arm, and a belleville spring 29 is inserted between the plate 22 and arm 26. The pivotal mounting between the upper and lower mould parts 18, 19, allows the top plate 22 of the mould to be moved between a closed position surmounting the bottom plate 21, as shown in FIGS. 3 and 4 and the left hand side of FIG. 2, and an open position displaced at 90° to the closed position and in which it is moved clear of the bottom plate as seen at the right hand side of FIG. 2. The spring mounting of the top plate on the arms 26 enables it to be brought into correct alignment with the bottom plate each time the mould is closed, and to ensure that the plates become aligned automatically, the bottom plate is equipped with a pair of dowel pins 30 having tapered upper ends, and the top plate is provided with sockets fitted with ring inserts 31 to receive the dowel pins. Thus, as the mould plates 21, 22 close together the dowel pins 30 enter the rings 31 thereby adjusting the position of the top plate 22 to register precisely with the bottom plate 21.

To move the upper mould part 19 between the open and closed positions, a lever 33 is keyed for rotation with the fulcrum pin 25. The lever 33 consists of a pair of parallel arms of L-shape which are interconnected at their free ends by a thrust block 34. A second lever 35 is pivoted between the arms of lever 33 on a pin 36 parallel to, but spaced from the pin 25. A strong coil compression spring 38 is inserted between the lever 35 and the thrust block and normally urges the lever 35 against a stop 39 fixed to the lever 33. At its free end the lever 35 carries rollers 40 which co-operate with a cam track 41 which is fixed on the frame 1 of the injection moulding machine and extends continuously around the axis of the rotor. The cam track is designed so that, as the mould sets 17 travel around on the turntable 12, they are opened and closed in accordance with a predetermined sequence of operations. When a mould is to be held open the cam track 41 maintains the lever 35 and hence lever 33 in a generally horizontal position as shown at the right hand side of FIG. 2, and when the mould is to be closed an inclined section of the cam track designated 42 in FIG. 1 moves the levers 35, 33 to a generally vertical position, as shown at the left hand side of FIG. 2. To ensure that the mould is clamped tightly closed the cam track is adapted to push the end of lever 35 radially outwardly so that the spring 38 is compressed and the full force of this spring acts through the lever 33 and arms 26 to hold the top plate 22 firmly against the bottom plate 21. A further inclined cam track section designated 43 in FIG. 1 adjusts the moulds from the closed position to the open position.

The mould plates 20, 21 include passages 45 for circulation of thermal fluid to stabilise the mould temperature and accelerate curing of the moulding material in the mould. The particular fluid will be chosen in accordance with temperature requirements. It could be cooling water in the case of thermoplastic moulding material, or it could be steam or as described below in the exemplary embodiment, hot water as the moulding material is thermosetting. For conducting the water to and from the mould plates annular inlet and outlet manifolds 50 and 51, respectively, are included in the rotor assembly and are mounted on the drive plate 10 by means of brackets 52. The manifolds 50, 51 are connected to the mould plates by pipelines 54 and are respectively connected to centrally located inlet tank 55 and outlet tank 56 by hoses 57. The tanks are supported on the rotor shaft 2 and are separated by a spacer 58. Hot water is fed to the inlet tank 55 by means of a rotary union 59, and the cooled water is discharged from the outlet tank 56 via a pipe 61 extending down through the centre of shaft 2, and a rotary union 62. From the foregoing it will be appreciated that the hot water circulates continuously, the flow path being inlet tank 55, inlet manifold 50, mould plates 21, 22, outlet manifold 51 and outlet tank 56. If it is required that water should be supplied to the mould plates only during part of the machine cycle, valves may be included in the pipelines 54 and can be operated by means of cams mounted on the machine frame.

Figure 1:
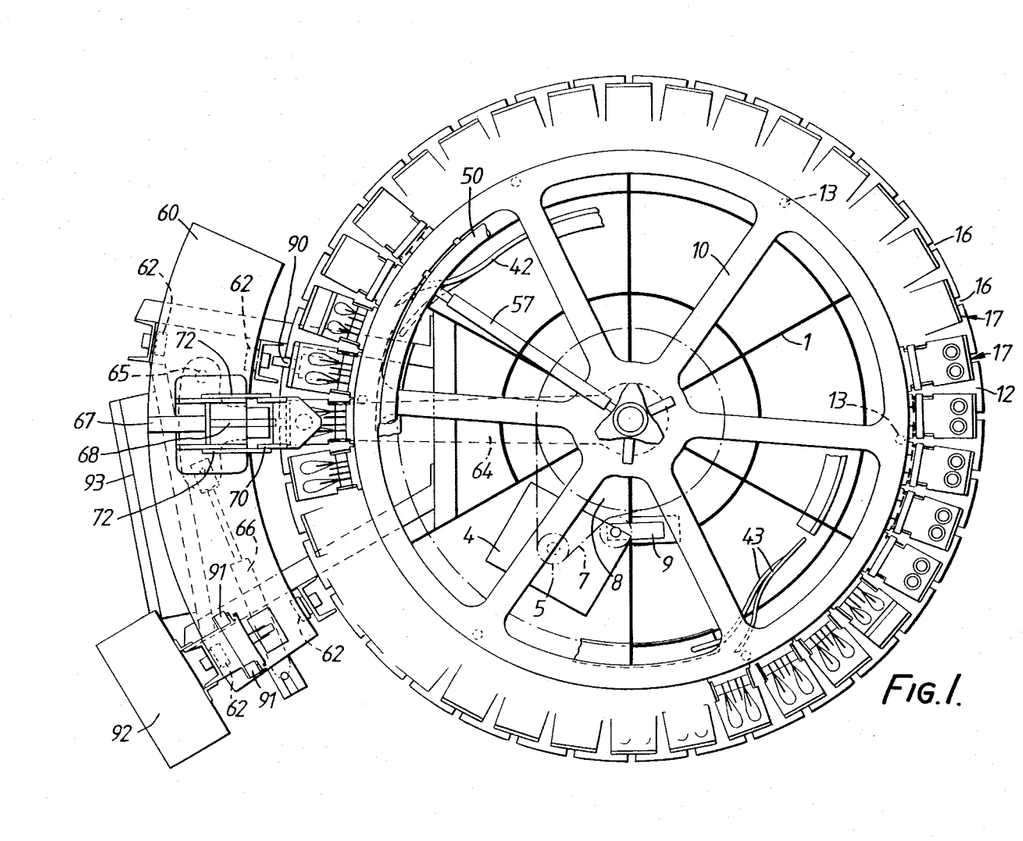
FIG. 1 is a top plan view of a rotary turret injection moulding machine according to the invention.

At the injection station of the moulding machine there is provide a clamping and injection assembly supported for reciprocal movement along an arcuate path centered on the axis of the machine rotor. A curved carrier plate 60 rests on support rollers 62 mounted on the machine frame 1, and a radial arm 64 journaled on the rotor shaft 2 and connected to the carrier plate by a pair of vertical tie bars 65 constrains the carrier plate 60 to move concentrically with the turntable 12. A fluid actuated ram 66 is coupled between the frame 1 and one of the tie bars 65 for effecting a return stroke of the carrier plate which is in the clockwise direction as seen in FIG. 1.

Mounted on the carrier plate 60 is a latching device comprising a fluid cylinder 67 and a latching key 68 connected to the piston rod of the cylinder. The cylinder is actuable to advance and retract the key 68 to engage and disengage the notches 16 formed in the periphery of the turntable 12. When the latch is engaged, the carrier plate becomes locked with the turntable and is driven around with it to perform a forward stroke of the clamping and injection assembly. When the latch is released the carrier plate 60 is freed to undergo a return stroke under the action of the ram 66.

Figure 5:
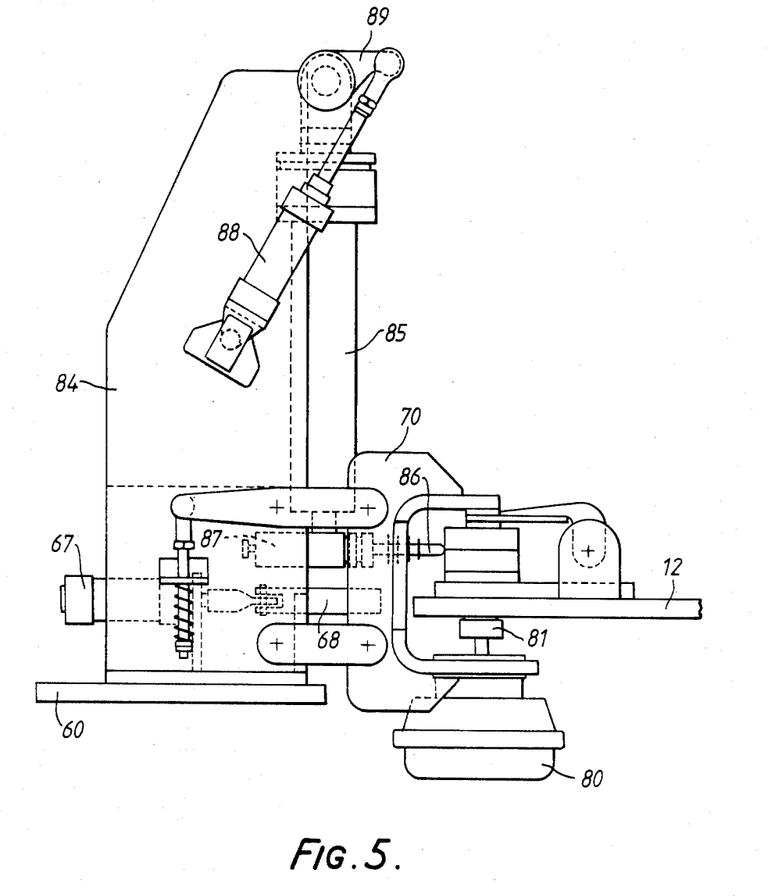
FIGS. 5 and 6 are views from opposite sides showing an injection device of the machine.
Figure 6:
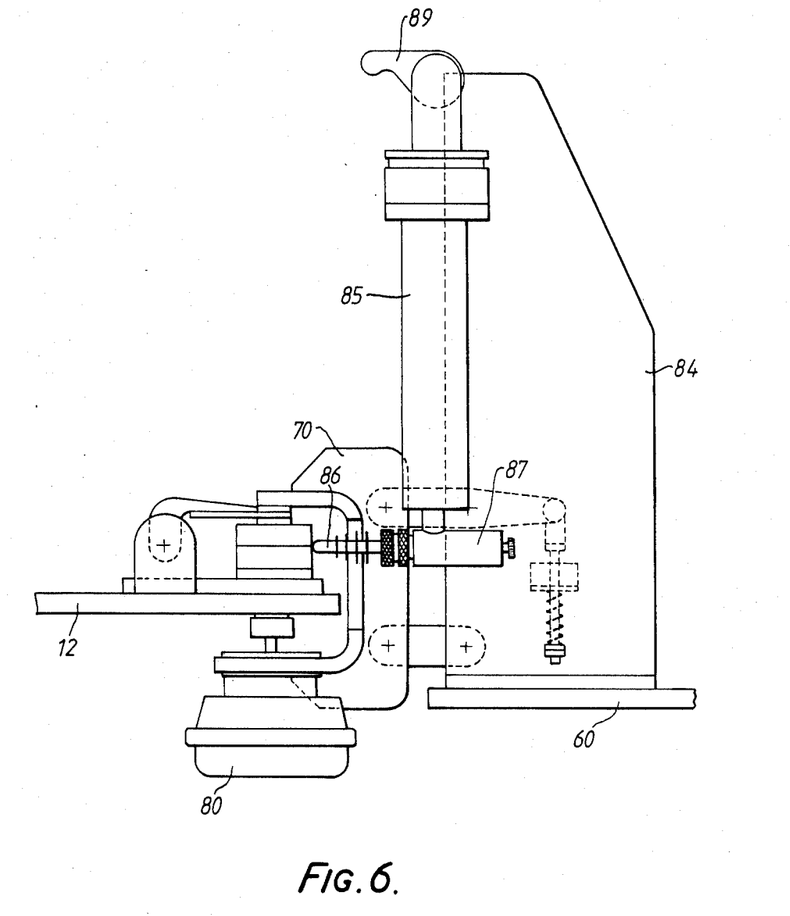

Also mounted on the carrier plate 60 is a clamping mechanism for exerting an increased closing force on each mould set as the moulding material is injected into the mould cavities. The clamping mechanism includes a pair of generally C-shaped brackets 70 each supported by a pair of parallel links 71, 72 pivoted to a vertical plate 73 upstanding from a mounting p late 74 which is fixed to the carrier plate 60. The vertical plates 73 and brackets 70 are spaced apart on either side of the latching mechanism 67, 68 as may be seen in FIG. 1. The upper links 72 are fashioned as levers and at their ends opposite the brackets 70 carry rods 75 which are urged downwardly by springs 76 acting between the ends of the rods and stops fixed on plates 73. A clamping member 78 of generally U-shaped cross-section is carried by the brackets 70 and an upper limb of this member is arranged to extend over the turntable 12 for engaging the upper parts 19 of the mould sets. The lower limb of member 78 supports a fluid actuator 80 which is operable to push a pressure plate 81 up against the under-side of the turntable 12. Thus, when the actuator 80 is activated, the pressure plate is pushed up to engage the turntable, and the reaction force causes the clamping member 78 to be pulled downwardly to engage the top of the mould set and the two mould plates 21, 22 become clamped tightly together under the full force of the actuator 80. The high clamping pressure applied by the actuator 80 holds the mould plates securely closed during injection of the moulding material into the mould cavities, it being essential to prevent parting of the mould plates at this stage if flash on the moulded plates is to be avoided. When the full clamping pressure is to be released, the pressure plate 81 is retracted by the actuator 80 and the clamping member 78 is lifted slightly under the action of springs 76 so as to be raised clear of the mould set. It will be appreciated that the clamping member 78 has an opening to enable the latching key 68 to move into co-operation with the turntable and this opening, or a further opening, allows an injection nozzle to be moved into co-operation with the clamped mould set. The injection device has been omitted in FIGS. 1 and 2 for reasons of clarity, but is clearly illustrated in FIGS. 5 and 6. It comprises a vertical support 84 extending upwardly from and fixed to the carrier plate 60. Pivoted to the upper end of the support 84 in the manner of a pendulum is a member 85 which swings in a plane radial to the axis of the machine rotor and bisecting the high pressure clamping mechanism. The lower end of the member 85 carries the injection nozzle 86 and a control valve 87 to control supply of moulding material to the nozzle. The material is fed to the upper end of member 85 and passes down through this member to the control valve. The member can for example be constructed as a mixer for mixing the moulding material on its way to the injection nozzle and can include a temperature control jacket. The member 85 can also be designed to perform other operations to suit the particular material being used. For pivoting the member 85 to move the nozzle 86 into and out of engagment with a clamped mould set a double acting fluid cylinder 88 is connected between a bracket on the support 84 and an arm 89 fast with the member 85. When the cylinder 88 is retracted the nozzle is withdrawn, and when the cylinder is extended the nozzle is swung forward into engagement with a mould, as seen in FIGS. 5 and 6.

A control system is provided to ensure synchronised operation of the machine, including the reciprocation of the clamping and injection assembly, the actuation of the fluid actuators 66, 67, 80 and 88, and the operation of the control valve 87. The control system includes a mould sensor 90 for sensing when a mould set is in correct position to be clamped by the clamping mechanism, micro-switches 91 for sensing the end positions of the carrier plate movement, and an electrical control unit 92. Control valves for the fluid actuators are included in a further control box 93 also mounted on the machine frame.

Operqtion of the described rotary turret moulding machine will now be explained by reference to the various steps involved in the cycle of one mould set. It will be understood that all the mould sets perform the same cycle but clearly the times at which the different steps are carried out will be staggered and will depend on the relative positions of the mould sets. The particular mould set will be assumed to be initially at the 3 o'clock position as viewed in FIG. 1. In this position, the mould is fully open as shown at the right hand side of FIG. 2. The turntable 12 is rotated continuously at a constant speed by the drive unit 4 and moves around counter clockwise as seen in FIG. 1. During the first 90° of rotation from the assumed initial position the mould remains fully open and cleaning operations can be performed on the mould plates 21, 22. Also, while the mould is open, any inserts to be included in the moulded articles should be loaded into the mould cavity. As rotation of the turntable 12 continues, the mould set approaches the inclined cam track section 42 which by acting on the lever 35 closes the upper mould part 19 down on the lower part 18 and clamps the mould plates closed under the force of spring 38. Full closure of the mould is achieved shortly before the mould reaches the injection station at a position diametrically opposite the initial position. Arrival of the mould set at said position is detected by the sensor 90, which actually works by sensing the immediately following mould set, and in response to a signal from the sensor 90 the control system actuates the cylinder 67 of the latching mechanism to engage the key 68 in the adjacent notch 16 of the turntable so that the carrier plate, and hence the clamping and injction assembly, become locked to the turntable 12 and start to move around with it. As soon as the latch has engaged, the actuator 80 is activated so that the mould set becomes clamped under high pressure between the clamp member 78 and the pressure plate 81. Next, the cylinder 88 is actuated to bring the injection nozzle 86 into co-operation with the inlet orifice of the mould set, and the control valve is opened for a preset time to inject a predetermined quantity of the moulding material into the cavities of the mould. The injection of material is completed during a small angle of rotation of the turntable, which in the illustrated embodiment is less than 10°, and before the carrier plate reaches the end of its forward stroke as determined by the microswitches 91. When this end position is reached the injection nozzle 86 is withdrawn by means of cylinder 88, the clamping pressure exerted on the mould set by actuator 80 is released so that the clamping mechanism disengages the mould set, the latching key 68 is retracted, and the ram 66 is actuated to return the carrier plate to its opposite end position ready for the next following mould set to be clamped and injected with moulding material.

Although the material is not fully cured when the high clamping pressure is removed, it still remains closed under the reduced closing force exerted by the spring 38. The hot water flowing through the passages in the mould plates 21, 22 accelerates the curing process and by the time the mould set reaches the inclined cam track section 42 the material will be set sufficiently to be handled. The inclined cam track section 43 effects opening of the mould, the upper part 19 of the mould being moved upwardly and inwardly away from the lower part 18 to facilitate unobstructed removal of the finished articles. The mould set has then travelled through 360° and the described cycle is repeated.

A moulding machine as described above has been constructed and tested and has proved highly successful in the manufacture of rings of silicone rubber. Because the clamping and injection assembly is arranged to move to and fro synchronously with rotation of the turntable, the turntable can be rotated continuously and problems associated with intermittent drive of a rotor with large inertia is avoided. By providing means to hold the moulds closed under spring force, a single high pressure clamping device can be employed to act on each mould set during injection of material and the machine construction is thereby simplified. The pivotal connection of the mould parts, as well as the spring mounting of the top mould plates contribute to the convenience of the machine by allowing unobstructed access to the opened moulds.

Modifications to the machine are, of course, possible without departing from the scope of this invention. For example, while the turntable has been described as having a gear and chain drive it will be understood that any mechanism capable of imparting continuous rotation to the turntable could be used. In addition, instead of being assembled from a number of parts the mould carriers could be of integral construction, such as cast members. Thus the parts 20, 24 may be combined in one casting and the arms 26 and parts 33 combined in another casting. Furthermore, the spring 38 could be arranged to act between the arms 26 and a lateral projection provided on the lever 35 and overlying the arms 26.

It is not important that the injection nozzle should be supported pivotally to be moved in a vertical plane as shown in FIGS. 5 and 6 and other arrangements are possible. All that is required is that the nozzle should be able to move into and out of engagement with each mould set, and it could alternatively be arranged to be pivoted in a horizontal plane or to be moved linearly in the radial direction.

Other modifications are also possible and will occur to skilled readers.

I claim:

1. An injection moulding apparatus comprising a turntable, drive means for continuously rotating the turntable, a plurality of mould sets carried on the turntable, a clamping and injecting assembly including means for clamping each mould set closed and means for injecting moulding material into the mould set while clamped closed by the clamping means, and means mounting the clamping and injecting assembly for reciprocal movement along an arcuate path in synchronizm with the rotation of the turntable.

2. An apparatus according to claim 1, including a central shaft mounting said turntable, said central shaft defining a rotation axis, said turntable being rotatable about said rotation axis of said central shaft, and the clamping and injecting assembly includes a support member and an arm, said arm having a first end journalled for rotation about said rotation axis of said central shaft and a second end attached to said support member for guiding the clamping and injecting assembly for movement concentric with the turntable.

3. An apparatus according to claim 1, wherein latching means is provided for latching the clamping and injecting assembly to the turntable for movement therewith during a forward stroke of said assembly, and means is provided for moving the clamping and injecting assembly through a return stroke when the latching means is disengaged.

4. An apparatus according to claim 1, wherein said turntable is annular and is freely supported by rollers mounted on a stationary frame and spaced apart around the turntable, said rollers being conical and so arranged that the turntable is self-centering during rotation thereof.

5. An apparatus according to claim 1, wherein each said mould set comprises first and second mould parts which are movable relative to each other between open and closed positions, said mould parts defining a mould cavity in the closed position thereof, the first mould part being fixedly mounted on said turntable and the second mould part being pivotable about an axis fixed with respect to the first mould part during said movement between the open and closed positions of the mould parts.

6. An apparatus according to claim 5, wherein said second mould part is pivotable through an angle of about 90° or greater in moving from the closed position to the open position.

7. An apparatus according to claim 5, wherein said second mould part is capable of tilting movement relative to the first mould part as said mould parts are brought together into the closed position, and guide means are provided on said mould parts and engage as the mould parts are moved into the closed position to ensure correct alignment between said mould parts.

8. An apparatus according to claim 7, wherein the guide means comprises projections on said first mould part and sockets for receiving the projections in said second mould part.

9. An apparatus according to claim 7, wherein said second mould part is carried on a pivoting arm in a manner permitting limited translational and tilting movement therebetween, and spring means is provided between said second mould part and said arm for urging said second mould part generally towards the first mould part.

10. An apparatus according to claim 1, including means for opening and closing the mould set, said means for opening and closing the mould sets including stationary cam means extending around the turntable axis and cam followers coupled to said respective mould sets and arranged to cooperate with the cam means to open and close each mould set in accordance with a predetermined sequence of operations as the turntable is rotated.

11. An apparatus according to claim 10, wherein said cam means is arranged to close each mould set as it approaches an injection station and to maintain the mould set closed for sufficient time to allow the injected material to cure after leaving the injection station, the clamping means comprising a device for clamping each mould set tightly closed under an increased clamping force during injection of moulding material into the mould cavity thereof.

12. An apparatus according to claim 10, wherein the cam follower is coupled to said second mould part of each mold set through spring means, whereby the cam means holds the mould parts closed under a predetermined spring force.

* * * * *